(12) United States Patent
Kim et al.

(10) Patent No.: US 8,229,450 B2
(45) Date of Patent: Jul. 24, 2012

(54) METHOD AND APPARATUS FOR CONTROLLING QUALITY OF SERVICE IN MOBILE COMMUNICATION SYSTEM

(75) Inventors: Jun Sik Kim, Daejeon (KR); Nam Hoon Park, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 471 days.

(21) Appl. No.: 12/515,559

(22) PCT Filed: Nov. 30, 2007

(86) PCT No.: PCT/KR2007/006157
§ 371 (c)(1),
(2), (4) Date: May 20, 2009

(87) PCT Pub. No.: WO2008/069507
PCT Pub. Date: Jun. 12, 2008

(65) Prior Publication Data
US 2010/0035623 A1  Feb. 11, 2010

(30) Foreign Application Priority Data
Dec. 7, 2006  (KR) .................. 10-2006-0124177

(51) Int. Cl.
*H04W 72/00* (2009.01)
(52) U.S. Cl. ............ 455/452.2; 370/229; 370/235; 370/236; 370/335; 370/395.2; 370/395.21
(58) Field of Classification Search .......... 370/229, 370/235, 236, 335, 395.21; 455/452.2
See application file for complete search history.

(56) References Cited

U.S. PATENT DOCUMENTS

| | | | |
|---|---|---|---|
| 7,551,941 B2* | 6/2009 | Makela et al. | 455/552.1 |
| 2002/0177413 A1* | 11/2002 | Jouppi et al. | 455/67.1 |
| 2003/0161323 A1* | 8/2003 | Harada et al. | 370/395.21 |
| 2005/0014509 A1* | 1/2005 | Semper et al. | 455/452.2 |
| 2006/0165027 A1* | 7/2006 | Heden | 370/328 |
| 2007/0002868 A1* | 1/2007 | Qian et al. | 370/395.21 |
| 2007/0242738 A1* | 10/2007 | Park et al. | 375/224 |
| 2009/0005061 A1* | 1/2009 | Ward et al. | 455/456.1 |

FOREIGN PATENT DOCUMENTS

| | | |
|---|---|---|
| KR | 100251778 | 1/2000 |
| KR | 100275470 | 9/2000 |
| KR | 1020030050564 | 6/2003 |
| KR | 1020030089925 | 11/2003 |
| KR | 1020060026351 | 3/2006 |
| WO | WO-2008/069507 A1 | 6/2008 |

* cited by examiner

*Primary Examiner* — Rafael Pérez-Gutiérrez
*Assistant Examiner* — Liton Miah
(74) *Attorney, Agent, or Firm* — Nelson Mullins Riley & Scarborough LLP; EuiHoon Lee, Esq.

(57) ABSTRACT

A method for controlling quality of service (QoS) in a mobile communication system includes configuring a service model to operate radio resources, based on an application to provide a requested service from a subscriber terminal; forming a QoS profile using the service model; allocating the radio resources for each requested services in accordance with the QoS; providing information on the allocated radio resources to the application; monitoring a condition of the allocated radio resource; and controlling the QoS by reflecting information obtained from the monitored condition.

7 Claims, 6 Drawing Sheets

[Fig. 1]
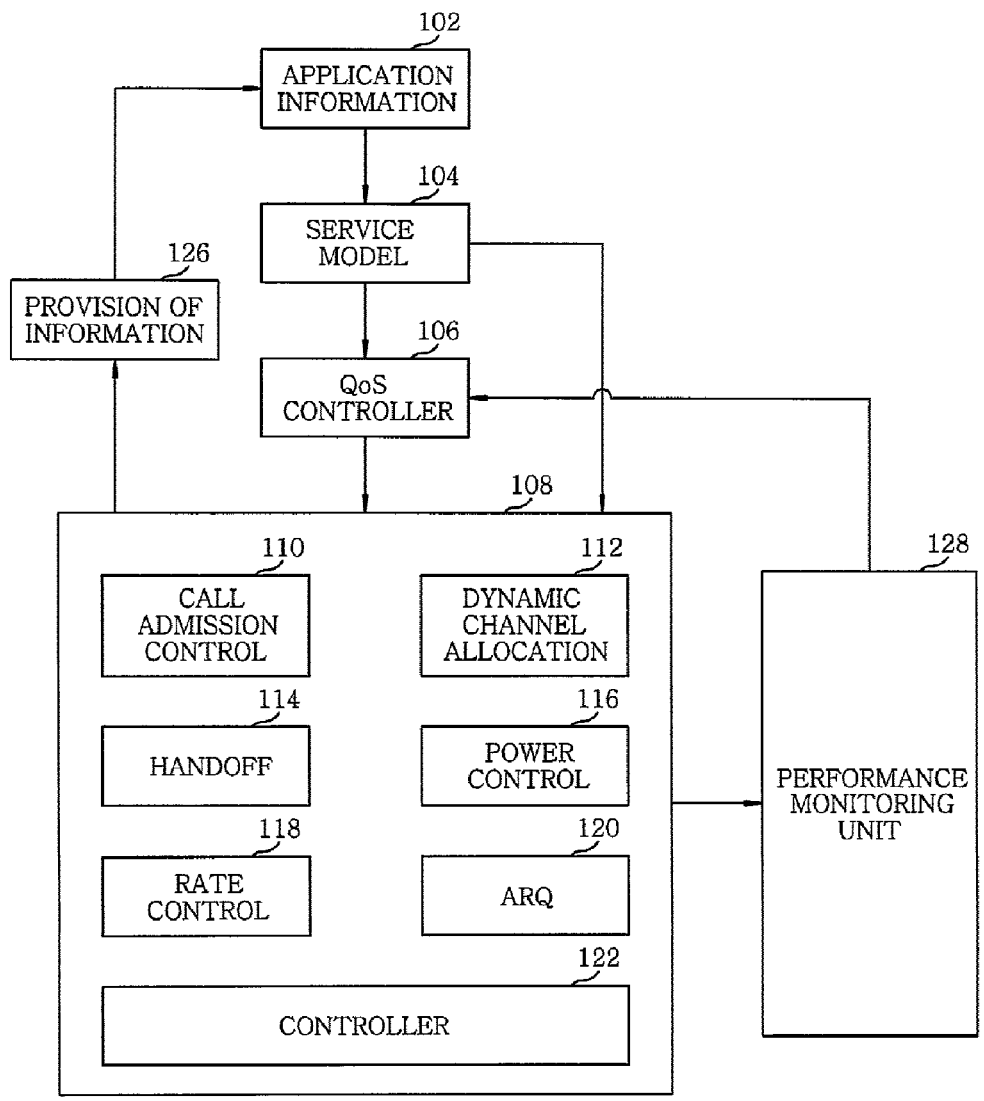

[Fig. 2]
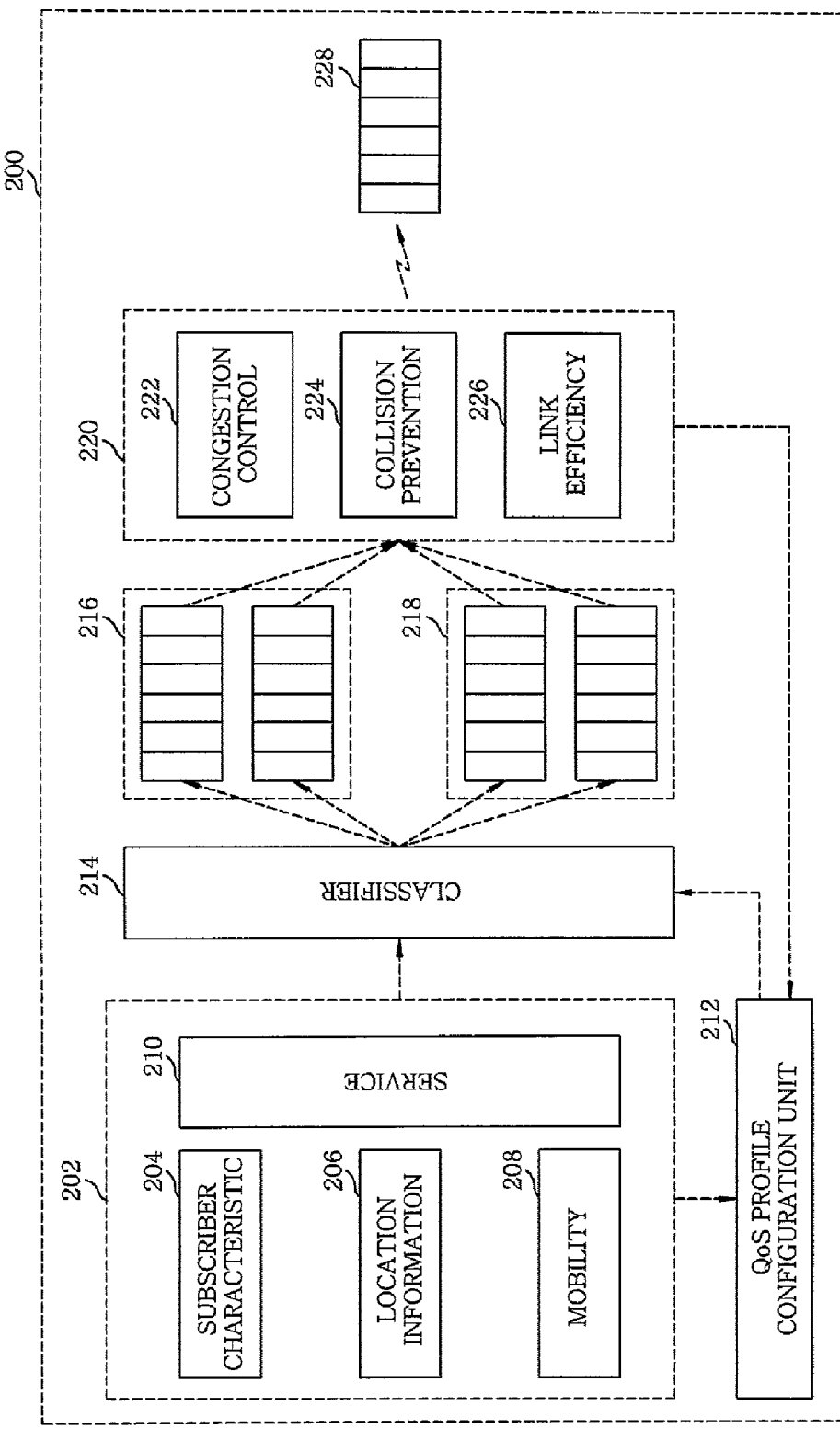

[Fig. 3]
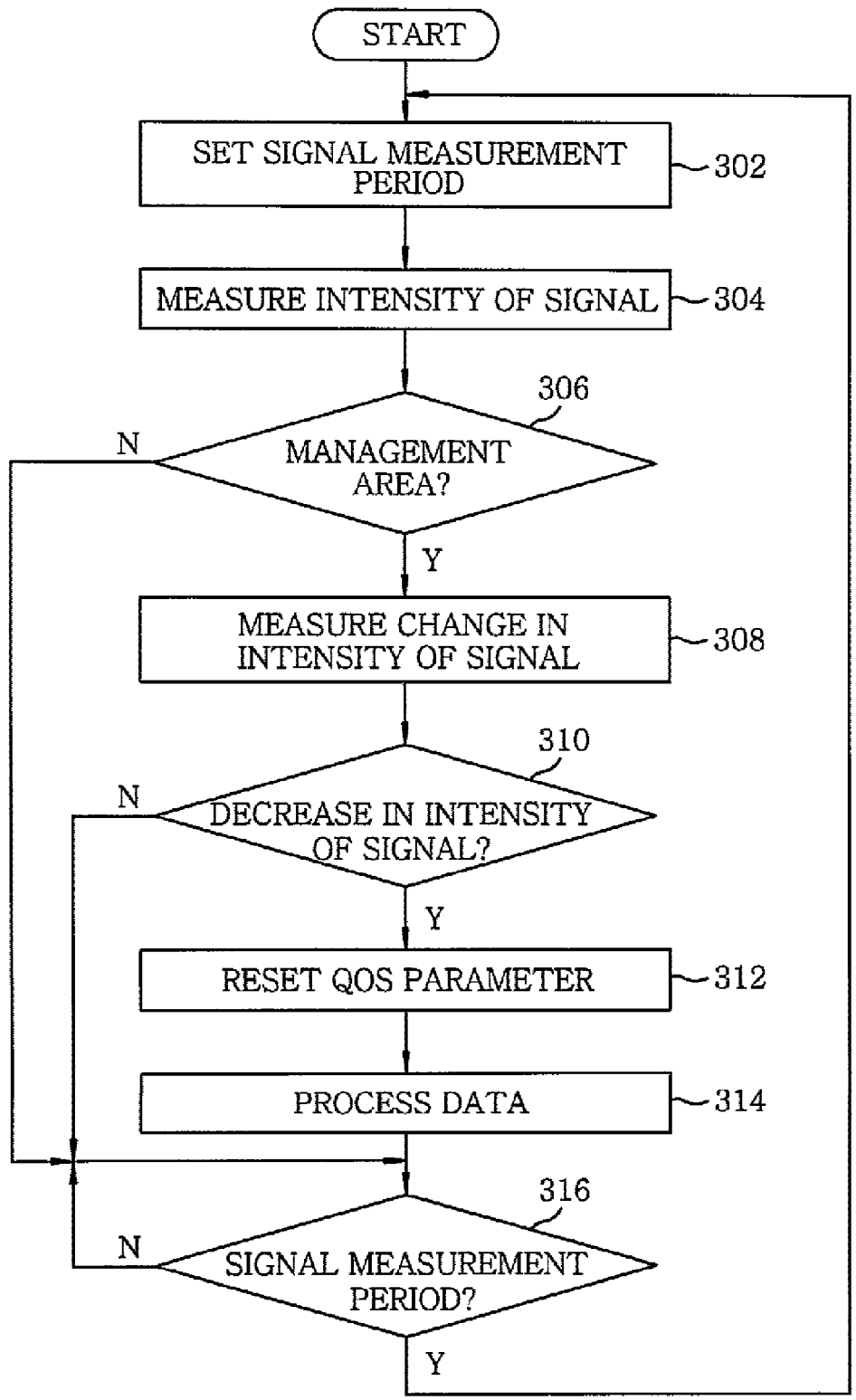

[Fig. 4]
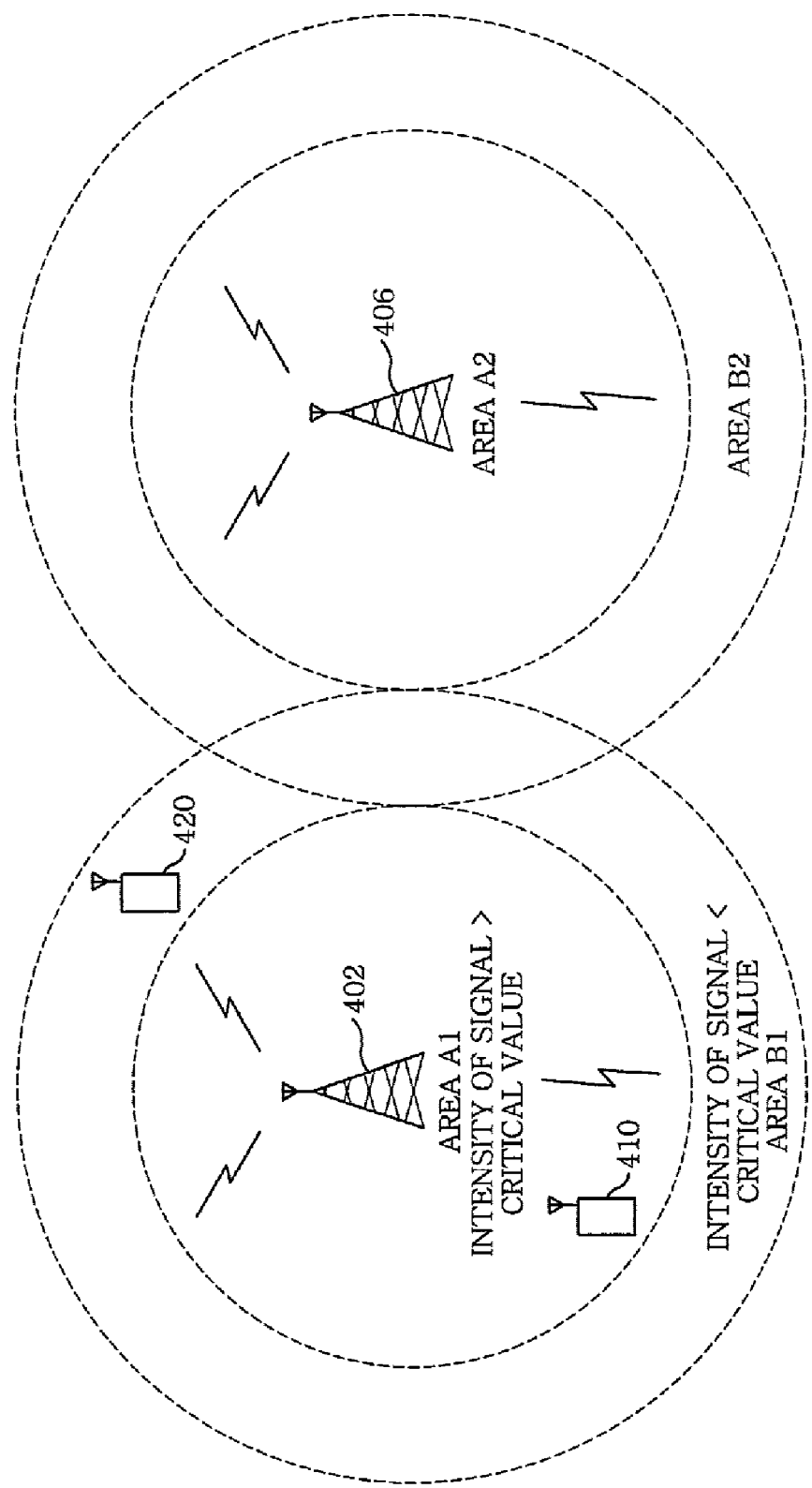

[Fig. 5]
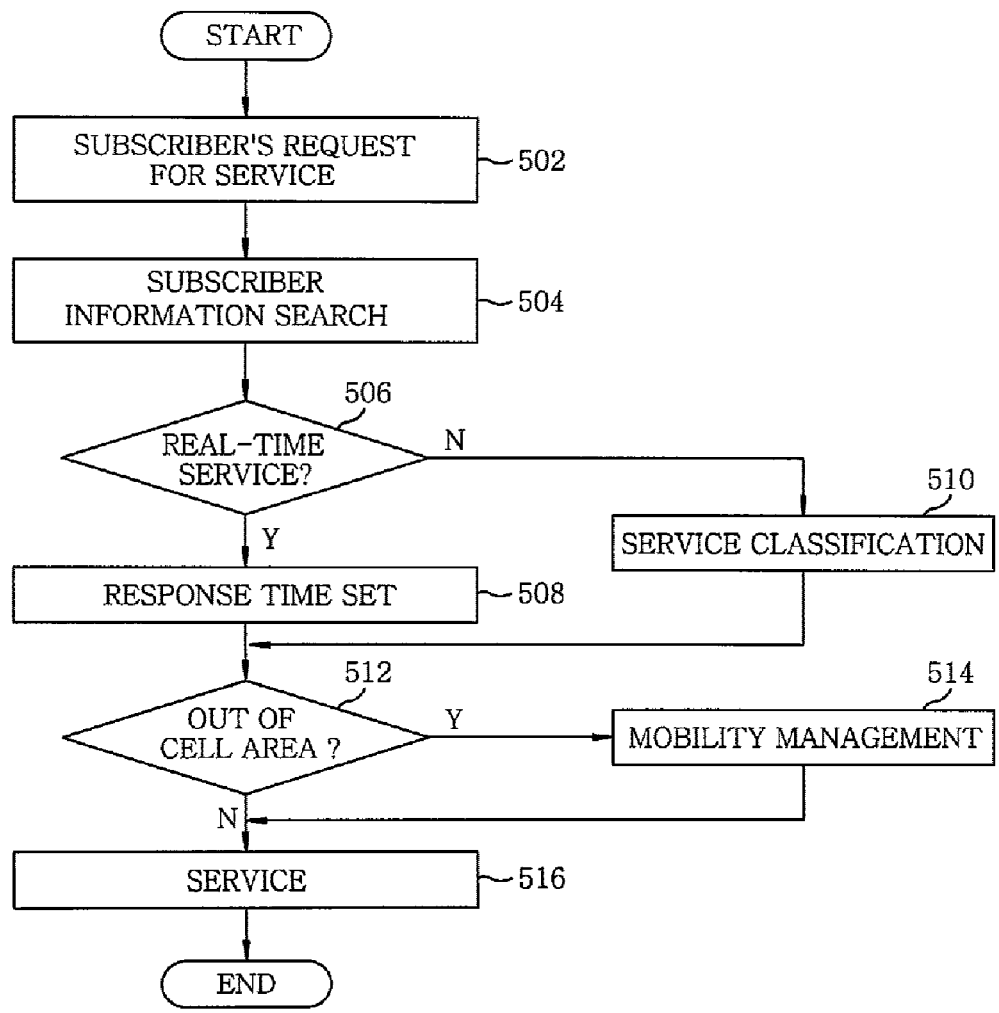

[Fig. 6]

| IDENTIFIER (602) | CLASSES (604) | MAXIMUM RATE (606) | MAXIMUM SDU (608) | RESPONSE DELAY TOLERANCE (610) | TRANSMITTING PATH NUMBER (612) | SUBSCRIBER OUT OF CELL (614) |
|---|---|---|---|---|---|---|
| ○ | ○ | ○ | ○ | ○ | ○ | ○ |
| ○ | ○ | ○ | ○ | ○ | ○ | ○ |
| ⋮ | ⋮ | ⋮ | ⋮ | ⋮ | ⋮ | ⋮ |

METHOD AND APPARATUS FOR CONTROLLING QUALITY OF SERVICE IN MOBILE COMMUNICATION SYSTEM

RELATED APPLICATIONS

This application is a 35 U.S.C. §371 national stage filing of PCT Application No. PCT/KR2007/006157 filed on Nov. 30, 2007, which claims priority to, and the benefit of, Korean Patent Application No. 10-2006-0124177 filed on Dec. 7, 2006. The contents of the aforementioned applications are hereby incorporated by reference.

TECHNICAL FIELD

The present invention relates to technology for controlling and operating quality of service (QoS) in a mobile communication system, and more particularly, to a method and an apparatus for controlling QoS in a mobile communication system which guarantees access quality in a radio access control hierarchy among radio protocol hierarchies.

This work was supported by the IT R&D program of MIC/IITA. [2006-S-012-01, Development of Middleware Platform Technology based on the SDR Mobile Station]

BACKGROUND ART

Since mobile communication systems use limited radio resources, a transfer characteristic of a radio link continuously changes with time under the influence of a change in the distance between a subscriber terminal and a base station, shadowing, fast fading, noise and so on. In a mobile communication system, a link adaptation technology is used for allocating and controlling the radio resources, which is adapted to the change in the characteristic of each link, when services are provided simultaneously to a number of subscribers within one cell area.

The link adaptation technology and a traffic adaptation technology are the core technology for radio resource management to provide a number of subscribers with various multimedia services by using the limited radio resources. A radio resource management technology includes call admission control, congestion control, dynamic channel allocation, handoff, power control, rate control, packet scheduling, load sharing, automatic repeat request (ARQ) and so on.

There has been suggested a variety of radio resource management technologies in the mobile communication system as follows.

Among them, a method for processing a radio resource management protocol in the conventional mobile communication system is to divide a layer-3 into a call control function block, a radio resource management function block and a mobility management function block. Correlations between the three blocks are excluded so that each block is independent and it facilitates a change of each function or an addition of new function. However, this conventional technology provides only the method for processing the radio resource management protocol in the radio resource management function block.

As another technology, there is provided a method for reducing a refusal rate for a packet service when a number of subscribers are registered in a particular cell area or when a traffic load in the particular area is large, by allocating radio resources based on a comparison between a predetermined limit value of QoS and a requested value of QoS for each routing region in a packet service of mobile switching center. This technology provides a method for controlling QoS in the mobile communication system, thereby improving the subscriber satisfaction of services in the particular cell area.

As one another conventional technology, there is provided a method for managing radio resources by defining levels corresponding to respective resource availabilities and informing a subscriber of a change in the resource availability by using notification such as an alarm for each level, thereby allowing the subscriber to simply manage an increase or a decrease in resource installation. This technology enables a manager of a base station to check, in real-time, a resource condition in the base station and it provides a standard of the increase or decrease in the resource installation, thereby efficiently managing the radio resources in the base station.

However, since these technologies for radio resource management do not teach any efficient management or operation of the limited radio resources, it is difficult to actively cope with differentiated service requests from subscribers, and it also has many restrictions in light of use of the radio resources.

As the radio data services to be selected by a subscriber become various, there are provided the services having diverse characteristics such as mobility and so on which are different from existing voice services. Accordingly, it is required to provide various resource allocation and requirements corresponding to the services. Moreover, to provide a number of subscribers with desired services using the limited radio resources and to efficiently operate the limited radio resources, it is required a scheme for clearly classifying the services requested by subscriber and characteristics thereof, and it is also required a scheme for applying and operating the radio resources accordingly.

DISCLOSURE OF INVENTION

Technical Problem

It is, therefore, an object of the present invention to provide a method and an apparatus for controlling quality of service (QoS) in a mobile communication system to guarantee the quality of appropriate service at a request from the subscriber by the use of limited radio resources.

Another object of the present invention is to provide a method and an apparatus for controlling quality of service (QoS) in a mobile communication system, by which manage radio resources by configuring a service profile for each subscriber and generating a QoS profile based on the service profile.

Technical Solution

In accordance with an aspect of the present invention, there is provided a method for controlling quality of service (QoS) in a mobile communication system, comprising:

configuring a service model to operate radio resources, based on an application to provide a requested service from a subscriber terminal;

forming a QoS profile using the service model;

allocating the radio resources for each requested services in accordance with the QoS;

providing information on the allocated radio resources to the application;

monitoring a condition of the allocated radio resource; and controlling the QoS by reflecting information obtained from the monitored condition.

In accordance with another aspect of the present invention, there is provided an apparatus for controlling quality of service (QoS) in a mobile communication system, comprising:

a subscriber information unit for configuring service and subscriber profiles using a requested service from the subscriber terminal;

a QoS profile configuration unit for configuring a QoS profile by using the service and subscriber profiles;

a classifier for classifying data to be transmitted as data for a real-time service and data for a non-real-time service, based on the QoS profile;

a buffer for temporally managing the data for real-time and non-real-time services; and a scheduler for controlling the buffer to transmit the data via a radio channel.

Advantageous Effects

As described above, the present invention is to manage the radio resources by configuring the service profile for each subscriber and generating the QoS profile based on the subscriber and service profiles, to provide the quality of proper services at the request from a subscriber in mobile communication.

BRIEF DESCRIPTION OF THE DRAWINGS

The above and other objects and features of the present invention will become apparent from the following description of embodiments given in conjunction with the accompanying drawings, in which:

FIG. 1 is a block diagram illustrating a scheme for radio resource management in accordance with an embodiment of the present invention;

FIG. 2 is a detailed block diagram the QoS controller shown in FIG. 1;

FIG. 3 is a flow chart illustrating a process of configuring a subscriber profile in accordance with the embodiment of the present invention;

FIG. 4 is a view illustrating a structure of determining intensity of a received signal and mobility in accordance with the embodiment of the present invention;

FIG. 5 is a flow chart illustrating a process of configuring a service profile in accordance with the embodiment of the present invention; and FIG. 6 is a view illustrating constituents of a QoS profile in accordance with the embodiment of the present invention.

BEST MODE FOR CARRYING OUT THE INVENTION

Hereinafter, the embodiments of the present invention will be described in detail with reference to the accompanying drawings so that they can be readily implemented by those skilled in the art.

The present invention is to manage radio resources by configuring a service profile for each subscriber and generating a QoS profile based on the service profile, in order to guarantee the quality of appropriate service at a request from a subscriber in mobile communication system.

That is, in the present invention to perform QoS control, when an initial service starts, location information of a subscriber is set based on the intensity of a received signal at a subscriber terminal; and the mobility of the subscriber terminal is determined by calculating a periodical change in the intensity of the received signal based on the location information. Further, the buffer is configured according to the quality of requested service from the subscriber; and the size of the buffer is controlled by comparing with a critical value of use of the buffer.

The next-generation mobile communication system aims at providing various multimedia communication services including internet, upon high-speed movement. In this case, multimedia traffic, acting as traffic load in the system, is much more complicates and variously changed, compared to typical voice traffic. A traffic adaptation technology is introduced to adaptively allocate radio resources pursuant to the traffic change.

The core technology of radio resource management is the system technology to build optimum solutions in which the radio resources are totally managed based on kinds of traffic, characteristics of a system of a transmitting end, characteristics of a channel, and information requested from a receiving end. A radio channel is expected to provide various services, such as e-mail, file transfer, the World Wide Web (WWW) and so on. However, these services have their own different service requirements.

For example, the real-time communication, such as a video-phone, allows a transmission error to certain extent but needs to maintain a minimum transfer rate to continuously perform the service. On the other hand, in the services which are not sensitive to a transmission delay to some extent, such as file transfer, a transfer rate thereof can be decreased to the minimum level for a short time. That is, the radio resources can be efficiently used if the transfer rate is controlled depending on the form of service of a subscriber in consideration of the extent of congestion in a mobile communication network.

The operative principles of the present invention will now be described in detail, with reference to the accompanying drawings.

FIG. 1 is a block diagram illustrating a scheme for a radio resource management in accordance with an embodiment of the present invention.

As shown in FIG. 1, a radio resource management unit (hereinafter refers to as a WSMU) comprises a base station which is connected wirelessly to a subscriber terminal (not shown). The WSMU performs to transmit and receive control signals and data signals, control quality of service (QoS) and allocate radio resources. The WSMU includes a QoS controller 106, a resource operation module 108 and a performance monitoring unit 128. The WSMU extracts a service model 104 based on information 102 of an application by which a service requested from a subscriber terminal is provided. The service model 104 serves to classify whether or not the service should be processed by the application in real time to produce a service profile. Based on the service model 104, the QoS controller 106 generates a QoS profile using the service model 104, and transfers data stored in a transmitting buffer (see, FIG. 2) to the resource operation module 108 in accordance with the requested service.

The resource operation module 108 properly allocates the radio resources 124 in accordance with the requested service from the subscriber. The resource operation module 108 manages the radio resources 124 through the use of inherent algorithm and comprises a plurality of functional components divided into a CAC (call admission control) 110, which is a request for service admission of a subscriber, a DCA (dynamic channel allocation) 112, a handoff 114, a PC (power control) 116, a RC (rate control) 118, and an ARQ (Automatic Repeat Request) 120 under the control of controller 122. The controller 122 configures and operates the components, and controls parameters for each of the components with reference to the service profile in response to an instruction issued from the QoS controller 106. In addition, for the mobile communication network having the mobility characteristics, the radio resource operation module 108 also performs a radio resource reservation function at the time of handover.

However, since the radio resources 124 are limited, information 126 on the current condition of the radio resources 124, which has already been utilized, is feedback and applied to the application to provide the requested service. That is, the current condition information 126 is provided to the application 102 so as to be configured in a desired operation method. When there are no components so that the operation method of the radio resources is unable to be configured in the desired manner, the components are downloaded to configure a resource operation function.

The whole operation status with respect to the radio resources 124 is monitored through a performance monitoring unit 128. The information monitored through the performance monitoring unit 128 is again provided to the QoS controller 106.

FIG. 2 is a detailed block diagram of the QoS controller 106 shown in FIG. 1.

As shown in FIG. 2, the QoS controller 106 is operated to guarantee the quality of the service requested by a subscriber. The QoS controller 106 comprises a plurality of the functional components. To efficiently operate the radio resources 124, the QoS controller 106 forms a QoS profile 212 by using a subscriber profile considering the mobility of the subscriber and a service profile classifying the characteristic of the requested service.

Specifically, the QoS controller 200 is operated based on a subscriber characteristic 204, location information 206 and mobility information 208 in a subscriber information unit 202, wherein the mobility information 208 is obtained based on deviation between intensities measured from previously and currently received signals at the subscriber terminal. The operation of the QoS controller 106 is started by a request for a service 210. The QoS controller 106 forms the QoS profile 212 based on the subscriber profile comprised of the subscriber characteristic 204, the location information 206 and the mobility information 208, and the service profile by the service 210 requested from the subscriber terminal.

The classifier 214 classifies the data to be transmitted by the subscriber terminal, based on the subscriber and service profiles. The data classified through the classifier 214 are divided into data for real-time service and data for non-real-time service. The data for the real-time service, such as audio and video services, are managed by a realtime buffer 216. The data for the non-real-time service, such as web, FTP (file transfer protocol) and the like, are managed by a non-real-time buffer 218. In case of the data for the real-time service, the real-time buffer 216 is configured to allocate the radio resources 214 according to a response speed required in each service. In case of the data for the non-real-time service, a part of the buffers 218 is allocated. However, as the real-time requirements increase, the part of the non-real-time buffer is reduced.

A scheduler 220 performs scheduling on the data provided from the classifier 214. A radio channel is allocated in consideration of the current radio condition and the scheduler 220 controls the real-time buffer 216 and the non-real-time buffer 218 to provide the data stored therein to a transmitting buffer 228 through the radio channel by considering a congestion control 222, a collision prevention 224 and a radio link efficiency 226. The data transmitted to the transmitting buffer 228 are then transferred to the radio resource operation module 108.

FIG. 3 is a flow chart illustrating a process of configuring the subscriber profile in accordance with the embodiment of the present invention.

The subscriber profile is configured from the subscriber characteristic 204, the location information 206 and the mobility information 208 as described with reference to FIG. 2.

When a subscriber terminal starts initial operating, a measurement period of received radio signal in the subscriber terminal is set in step 302, and intensity of the received signal is measured in step 304. Therefore, the location information 206 of the subscriber terminal can be obtained.

Thereafter, in step 306, if it is checked whether or not the subscriber terminal is located within a management area with reference to the intensity measured in step 304.

If the subscriber terminal is not located within the management area in step 306, a control process goes to step 316 to wait until a subsequent measurement period.

However, if the subscriber terminal is located within the management area, a control process proceeds to step 308, where a deviation between the intensities measured at consecutive measurement periods is calculated.

In this regard, the description of the management area will be made in detail with reference to FIG. 4. In FIG. 4, there are two kinds of signal areas A1, A2, B1 and B2. Each area of A1 402 and A2 406 adjoin the center of each base station 402, 406. In area A1 or A2, since the signal receiving sensitivity is higher than a predetermined critical value, the intensity of the signal is excellent. Therefore, a subscriber terminal 410 belonging to the area is regarded within the management area. On the other hand, the area B1 or B2 is far from the center of the base station 402 or 406, respectively. In this area, since the intensity of the signal does not reach the critical value, a subscriber terminal 420 belonging to the area B1 or B2 is regarded within a non-management area, which is out of a cell area. Therefore, the mobility information 208 can be obtained.

The deviation of the signal intensities, which is measured in step 308, is obtained from a change between a previously measured value and a currently measured value. If the changes indicate the decreasing directionality in step 310, the QoS profile is re-set in step 312 by updating the mobility information in the subscriber profile and the relevant data, for example, the relevant data to a hand over is processed in step 314.

However, if the changes indicate the increasing directionality, a control process goes to step 316 to wait until a subsequent measurement period, and then the control process will be repeated as described above.

FIG. 5 is a flow chart illustrating a process of configuring the service profile in accordance with the embodiment of the present invention. The service profile is configured from the service 210 requested by the subscriber terminal as in FIG. 2.

When a requested service from the subscriber terminal is received in step 502, the subscriber profile configured as in FIG. 3 is searched in step 504.

After that, it is determined whether or not the requested service from the subscriber terminal is a real-time service in step 506. If the requested service is the real-time service, a response time is set on the QoS profile 212 as in step 508.

However, if the requested service is not the real-time service, a control process goes to step 510.

In step 510, the requested service is simply classified as it is not the real-time service, and then a control process goes to next step 512.

In step 512, it is determined whether or not the subscriber terminal is within the management area.

If it is determined that the subscriber terminal is out of the management area, then the subscriber is subject to a mobility management as in step 514.

If, however, it is determined that the subscriber terminal is located within the management area, then, in step 516, the requested service is performed.

FIG. 6 is a view illustrating constituents of the QoS profile in accordance with the embodiment of the present invention.

In FIG. 6, the QoS profile is produced based on the subscriber profile and the service profile, and may have parameters, such as an identifier 602 indicating an ID for each service to be classified, a class 604 indicating a real-time class or a non-real-time service class, a maximum transmission rate 606 for a corresponding service and a maximum SDU (service data unit) 608 for a corresponding service, a response delay tolerance 610 and a transmitting path number 612 to indicate buffers under waiting, and a terminal (subscriber) out of a cell 614 subjected to managing the mobility. Here, the QoS profile shall not be limited to the aforementioned parameters.

While the invention has been shown and described with respect to the embodiments, it will be understood by those skilled in the art that various changes and modifications may be made without departing from the spirit and scope of the invention as defined in the following claims.

The invention claimed is:

1. A method for controlling quality of service (QoS) in a mobile communication system, comprising:
    configuring, at a base station of the mobile communication network, a service model to operate radio resources, based on an application to provide a requested service from a subscriber terminal;
    forming, at the base station, a QoS profile using the service model,
    wherein said forming the QoS profile includes:
        setting a management area as location information of the subscriber terminal, based on intensity of a received signal in the subscriber terminal,
        extracting information on mobility of the subscriber terminal by calculating a periodical change in the intensity of the received signal based on the set location information,
        generating a subscriber profile considering the mobility information of the subscriber terminal,
        generating a service profile considering a service characteristic of the requested service, and
        configuring the QoS profile, based on information on the subscriber and service profiles; allocating, from the base station, the radio resources for each requested services in accordance with the QoS;
    providing information on the allocated radio resources to the application;
    monitoring a condition of the allocated radio resource; and
    controlling the QoS by reflecting information obtained from the monitored condition.

2. The method of claim 1, wherein the step of allocating of radio resources includes allocating the radio resources to components including at least one call admission control, dynamic channel allocation, handoff, power control, rate control, automatic repeat request (ARQ) and scheduler.

3. The method of claim 1, wherein the step of controlling the QoS further comprises:
    classifying the requested service into a real-time service and a non-real-time service, based on the QoS profile;
    configuring data buffers for the real-time and non-real-time services; controlling the size of the data buffer for each service; and
    configuring a transmitting buffer by performing scheduling of the data buffers for each service.

4. The method of claim 3, wherein the step of controlling the size of the data buffers for each service comprises:
    for the real-time service, allocating the data buffers to data to be transmitted in accordance with a response speed of the requested service; and for the non-real-time service, allocating a portion of the data buffers to data to be transmitted, wherein the portion of the data buffers is reduced as the real-time service increase.

5. An apparatus for controlling quality of service (QoS) in a mobile communication system, comprising:
    a subscriber information unit for configuring service and subscriber profiles at a base station using a requested service from the subscriber terminal;
    a QoS profile configuration unit for configuring a QoS profile at the base station by using the service and subscriber profiles, and wherein configuring the QoS profile at the base station includes:
        setting a management area as location information of the subscriber terminal, based on intensity of a received signal in the subscriber terminal;
        extracting information on mobility of the subscriber terminal by calculating a periodical change in the intensity of the received signal based on the set location information;
        generating a subscriber profile considering the mobility information of the subscriber terminal;
        generating a service profile considering a service characteristic of the requested service;
        configuring the QoS profile, based on information on the subscriber and service profiles;
    a classifier for classifying data to be transmitted as data for a real-time service and data for a non-real-time service, based on the QoS profile;
    a buffer for temporally managing the data for real-time and non-real-time services; and
    a scheduler for controlling the buffer to transmit the data via a radio channel.

6. The apparatus of claim 5, wherein the subscriber information unit sets a management area based on intensity of a received signal in the subscriber terminal at each signal measurement period, discriminates the subscriber terminal out of the management area by measuring a deviation of the intensities, and performs mobility management with respect to the subscriber terminal out of the management area.

7. The apparatus of claim 5, wherein the buffer is allocated to the data for real-time service in accordance with a response speed of the requested service, for the realtime service, and a portion of the buffer is allocated to the data for the nonreal-time service; and
    wherein the portion of the buffer is reduced as the real-time service increase.

* * * * *